United States Patent [19]

Hammerle et al.

[11] Patent Number: 4,706,868

[45] Date of Patent: Nov. 17, 1987

[54] PANEL FASTENER ASSEMBLY SYSTEM

[75] Inventors: Frederick A. Hammerle, Topsfield, Mass.; Philip M. Allen, Lathrup Village, Mich.; Richard Geddes, Boston, Mass.; Gary R. Malone, Rochester, N.H.

[73] Assignee: TRW Inc., Cleveland, Ohio

[21] Appl. No.: 832,079

[22] Filed: Feb. 24, 1986

[51] Int. Cl.[4] .......... B25C 1/02; B23P 19/00

[52] U.S. Cl. .......... 227/149; 29/739; 29/747; 227/116

[58] Field of Search .......... 222/22; 227/114, 116, 227/149; 29/739, 747

[56] References Cited

U.S. PATENT DOCUMENTS

| | | | |
|---|---|---|---|
| 1,031,348 | 7/1912 | LaMay . | |
| 1,467,604 | 9/1923 | Bowen et al. . | |
| 1,801,456 | 4/1931 | Pryor . | |
| 2,244,595 | 6/1941 | Amiot | 227/149 |
| 2,365,787 | 12/1944 | Wallace . | |
| 2,591,285 | 4/1952 | Overly . | |
| 2,953,049 | 9/1960 | Vilmerding . | |
| 2,979,229 | 4/1961 | Reeder et al. . | |
| 3,029,978 | 4/1962 | Gummere et al. . | |
| 3,043,614 | 7/1962 | Eichmann . | |
| 3,319,826 | 5/1967 | Gallagher . | |
| 3,490,677 | 1/1970 | Pezza | 227/149 X |
| 3,521,398 | 7/1970 | Coutts | 227/149 |
| 3,643,852 | 2/1972 | Kowalczyk et al. | 227/149 |
| 3,668,760 | 6/1972 | Biederman et al. | 227/149 |
| 4,470,531 | 9/1984 | Anstett | 227/116 X |
| 4,519,534 | 5/1985 | White | 29/739 X |

FOREIGN PATENT DOCUMENTS

| | | | |
|---|---|---|---|
| 508826 | 10/1920 | France | 227/149 |
| 1276347 | 10/1961 | France | 227/149 |

OTHER PUBLICATIONS

*American Machinist;* Sep. 10, 1903; p. 1309.

*Primary Examiner*—Paul A. Bell

*Attorney, Agent, or Firm*—Fay, Sharpe, Beall, Fagan, Minnich & McKee

[57] ABSTRACT

A system to facilitate installation of push-in type fasteners including apparatus to feed fasteners to an escapement unit and a manually actuable hand tool to take the fasteners from the escapement unit and insert them in a workpiece. The apparatus includes a vibratory bowl feeder for providing a continuous supply of fasteners to a track member extending between the vibratory bowl feeder and the escapement unit. The escapement unit aligns a first fastener for receipt in the fastener inserting tool, positions a second fastener for subsequent alignment, and limits advancement of the second fastener until the first fastener has been removed from the escapement unit. The fastener inserting tool comprises an outer housing or handle that carries a press rod and an outwardly biased insert body. The insert body has fastener grasping jaws at one end. The jaws are normally disposed in a position to grasp a fastener, but pivot outwardly to a non-grasping position when the insert body moves inwardly relative to the housing. Once a fastener is grasped by the inserting tool, inward movement of the insert body relative to the press rod causes the jaws to release the fastener and the press rod to push the fastener out of the tool into a fastener receiving opening in a workpiece.

6 Claims, 9 Drawing Figures

PANEL FASTENER ASSEMBLY SYSTEM

BACKGROUND OF THE INVENTION

This invention pertains to the fastener art and, more particularly, to a system for installing panel fasteners. The invention is particularly applicable for use in the manual installation of molded plastic ratchet fasteners and will be described with particular reference thereto. It will be appreciated, however, that the invention has broader application and may advantageously be employed in installing other types of fasteners in many different environments.

There are many different automatic and semi-automatic fastener feeding and installation systems known in the prior art. Typically, these systems include pneumatic, hydraulic, or electrical systems which continuously feed a supply of the fasteners directly to the chuck or discharge element of an installation tool. The tool is manually or mechanically aligned with the fastener receiving opening and actuated to drive the fastener into the opening.

These systems are particularly advantageous at assembly line stations where large numbers of fasteners must be continuously installed and/or in environments where the primary job is fastener installation. The systems are, however, generally expensive and require significant floor space because of the associated pressure lines, power connections, and the like. Thus, at assembly line locations or other environments where there is frequent product changeover, or where only a few fasteners must be installed at spaced time intervals, the expense and space requirements of these systems makes them difficult to justify on an economic basis. Often in such environments, fastener installation has been a strictly hand operation with the installer manually grabbing the fastener and forcing it into the opening with his fingers. Because installing fasteners in that manner is quite difficult and time consuming, workers sometimes fail to install a full complement of fasteners or to install the fasteners properly.

In view of the foregoing, it would be desirable to provide a fastener installation system which is especially suited for use in situations where there is frequent production line changeover or in situations where only a few fasteners are installed at random time intervals. The subject invention is deemed to meet these needs and others in providing a system which is simple, comparatively inexpensive, and greatly facilitates fastener installation.

SUMMARY OF THE INVENTION

According to the invention, a fastener installation system is provided which includes apparatus for feeding and transferring fasteners from a reservoir of fasteners to a location where they can be individually seized by an associated hand tool. The apparatus comprises a track means having one end connected to the reservoir and the other end joined to an escapement unit. The escapement unit receives the fasteners and continually presents individual fasteners at a loading station for engagement with the associated inserting tool. The escapement unit is biased to a first position adapted to receive the tool and is selectively movable to a second position where an individual fastener at the loading station is grasped by the tool. The unit includes means operable in response to movement of the associated inserting tool to limit movement of a subsequent fastener into the loading station until the preceding fastener has been removed.

According to a further aspect of the invention, the fastener inserting tool includes a housing having a central opening and carrying a push rod and a slidable, outwardly biased, insert body. Associated with the insert body are grasping means for gripping the head of a fastener. The grasping means are related to the insert body such that when the body is in the outwardly biased position, the grasping means is in a fastener gripping position. When the insert body is moved inwardly of the housing against the biasing means, the grasping means moves to a non-gripping position and the push rod forces the fastener out of the grasping means.

The relationship between the escapement mechanism and the fastener inserting tool is such that the act of manually inserting the tool into the escapement mechanism aligns the grasping means with the loading station to receive the head of the fastener. As the tool is withdrawn, the grasping means grips the fastener head and pulls the fastener from the escapement mechanism. In addition, as the tool and fastener are withdrawn, the escapement mechanism allows the next fastener in line to move into the loading station.

With the fastener gripped in the tool, the stem of the fastener extends outwardly of the tool in a position where it can be readily aligned with the fastener receiving opening in the panel or other component being fastened. The insertion force applied to drive the fastener into the opening causes the grasping means to open and release the fastener head. The continued application of axial force causes the press rod to act against the fastener head and complete the insertion of the fastener.

A principal advantage of the subject invention is the provision of a fastener installation system which allows simple axial movement of the inserting tool to both load fasteners into the tool and insert fasteners into the parts being joined.

Another advantage of the invention resides in the provision of an apparatus of the type described which does not require complicated controls, special feed lines, or similar equipment.

A further advantage of the invention is found in the provision of a fastener installation system which utilizes a minimum number of component parts, and is simple and comparatively inexpensive.

Still further advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment which will be described in detail in this specification and illustrated in the accompanying drawings which form a part hereof and wherein.

DETAILED DESCRIPTION OF THE PREFERRED EMBODIMENT

Figures 1, 3, 4:
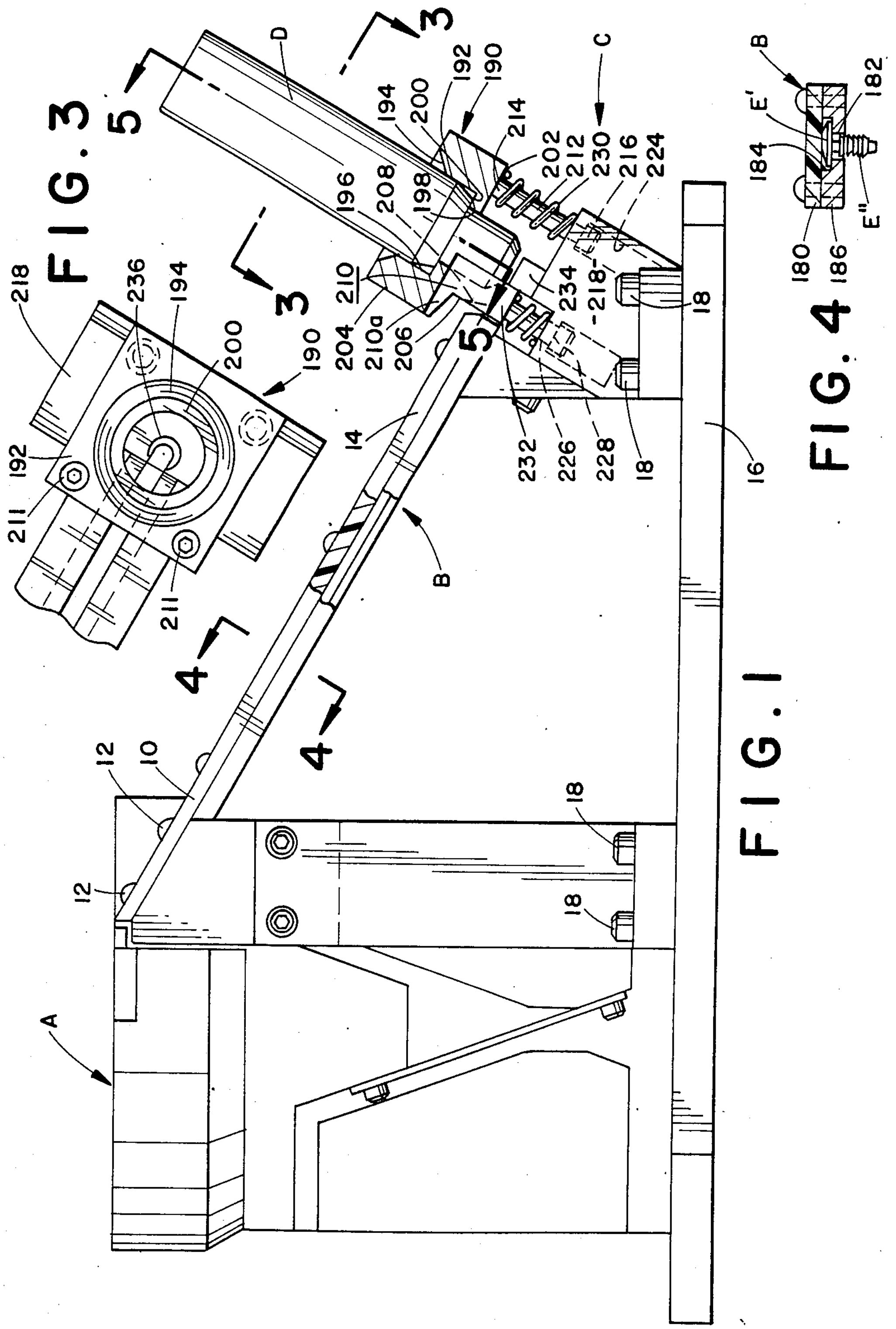
FIG. 1 is an elevational view of the panel fastener installation system of the subject invention.
FIG. 3 is a plan view taken along lines 3—3 of FIG. 1 with the fastener inserting tool removed therefrom for ease of illustration.
FIG. 4 is a cross-sectional view taken along lines 4—4 of FIG. 1 particularly illustrating the receipt of a fastener in the track.

Referring now to the drawings wherein the showings are for purposes of illustrating the preferred embodiment of the invention only and not for purposes of limiting same, FIG. 1 shows the complete panel fastener installation system. As shown, a reservoir, such as a conventional vibratory bowl feeder A, provides a continuous supply of the panel fasteners to a guide means or track B which is connected to an escapement unit C. A hand operable, fastener inserting tool D is adapted to remove fasteners individually from the escapement unit C in a manner to be described.

As illustrated, the upper end 10 of the track B is secured to the bowl feeder A by machine screws 12. A second or lower end 14 of the track is connected to the escapement unit C. The bowl feeder A and the escapement unit C are secured to a base plate 16 in any convenient manner, such as by bolts 18. The escapement unit is adapted to receive the continuous supply of fasteners from the track and align them for removal. Moreover, the escapement unit controls the movement of the fasteners so that when a first fastener is presented for removal, a second fastener is aligned and held in position to take the place of the first fastener upon removal thereof.

Fastener inserting tool D is adapted to be operatively received by the escapement unit C to remove a fastener therefrom. For this purpose the tool D includes a biased grasping end for removing individual fasteners from the escapement unit. The fastener is retainingly held by the inserting tool during transport to a fastener receiving opening in a panel, workpiece, or other component being fastened. The act of moving of the tool toward the workpiece opening, biases the tool into a non-grasping or fastener release position and, simultaneously, causes the fastener to be pushed into the opening.

Figure 2:
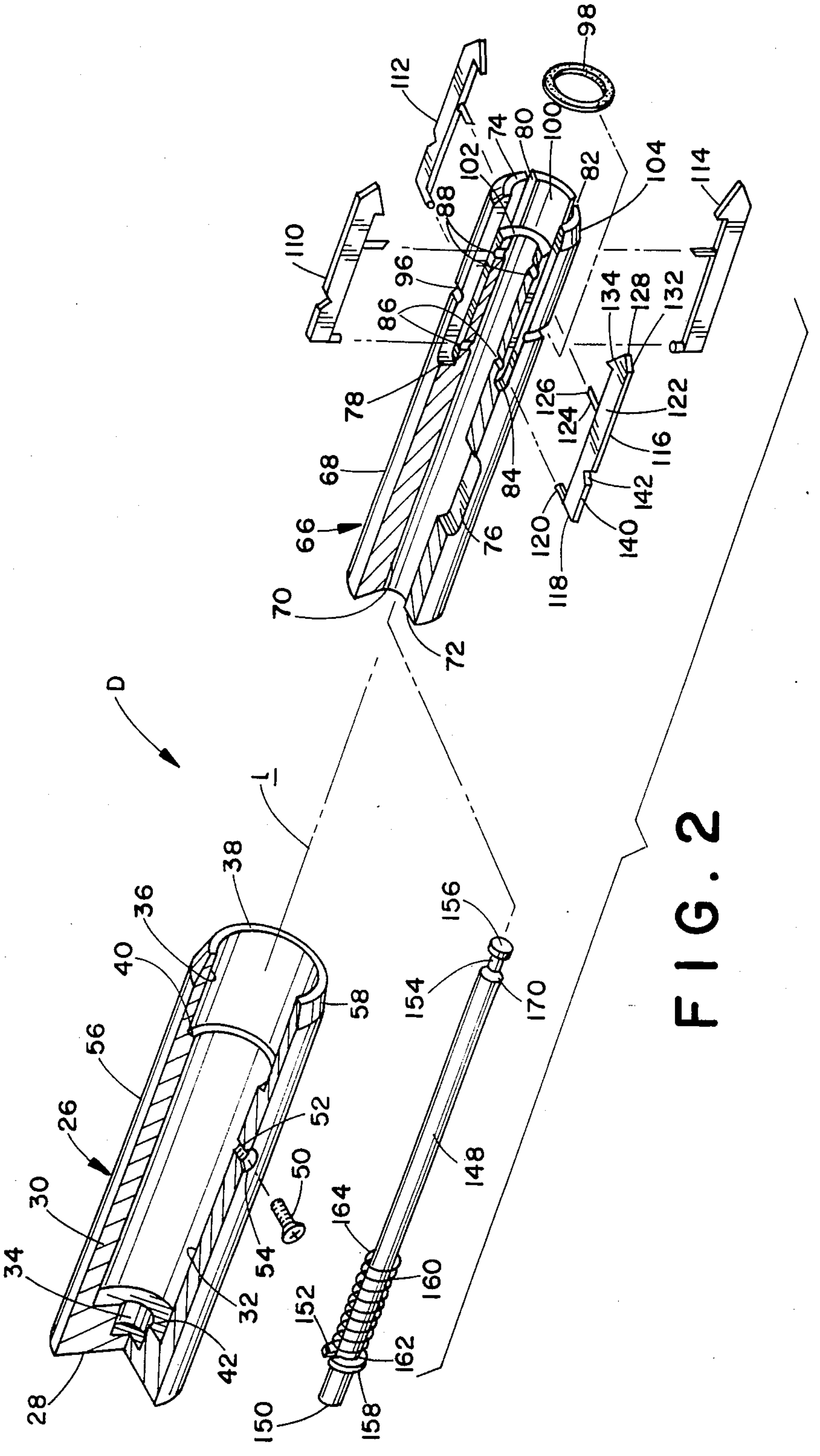
FIG. 2 is an exploded perspective view of the fastener inserting tool.
Figure 5:
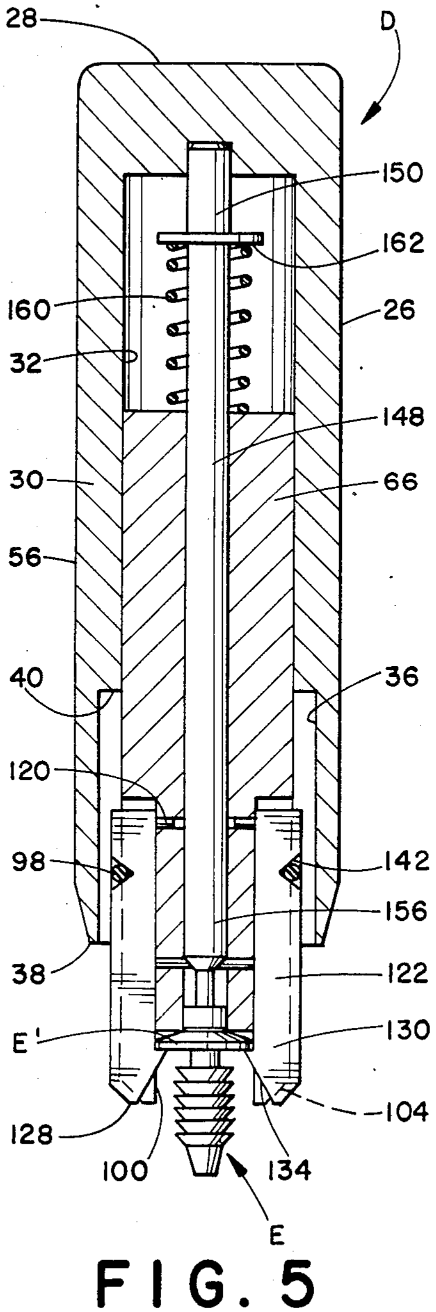
FIGS. 5 and 5A are cross-sectional views taken along lines 5—5 of FIG. 1 showing, respectively, the inserting tool in fastener gripping and fastener releasing modes.
Figure 5A:
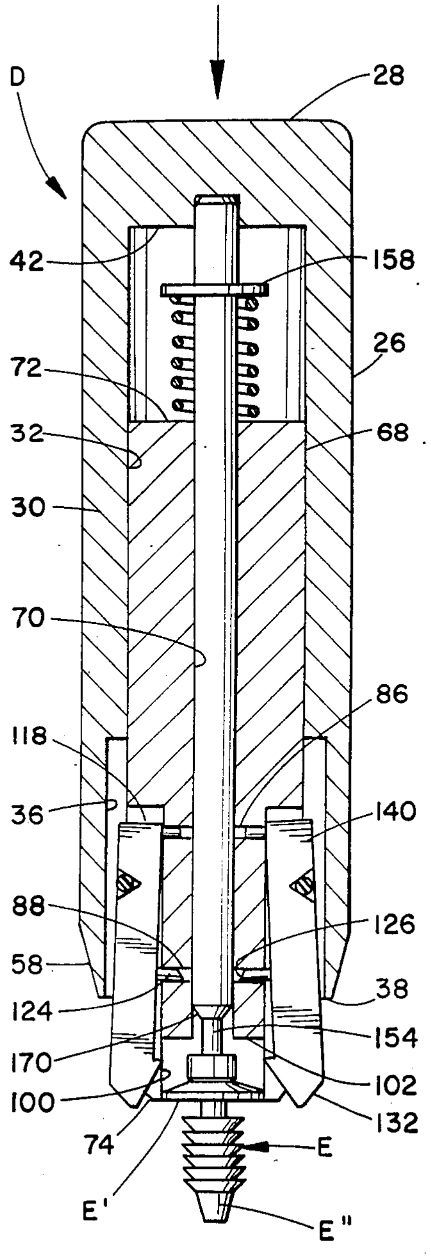

The preferred construction of the fastener inserting tool can best be understood with particular reference to FIGS. 2, 5, and 5A. As shown therein, the fastener inserting tool D includes an outer housing or handle 26 which is designed for manual grasping by a worker. Preferably, the outer housing 26 is formed of aluminum, although other structural materials may be used as necessary with equal success. The housing has a first, closed end 28 formed integrally with an elongated tubular sleeve 30 having a central, axially extending bore 32. A reduced diameter cavity or counterbore 34 is formed adjacent the closed end 28 for receipt of a press rod as will subsequent be described. An expanded counterbore 36 is provided at the second or open end 38 of housing 26. Formed between the central bore 32 and the countbore 36 is a transverse shoulder 40. A second shoulder 42 is also generally transverse to the longitudinal axis of the fastening tool and is positioned at the end of central bore 32.

The exterior surface 56 of the tubular sleeve 30 has a chamber 58 defined adjacent the open housing end 38. A retaining means 50, shown as a screw or key in the preferred embodiment, is adapted to pass through the tubular sleeve 30 at opening 52. The opening may include a countersunk portion 54 for receiving the head end of retaining means 50 to thereby present a smooth surface on the exterior of the outer housing.

An insert body 66 is closely and slidably received in central bore 32 of the outer housing. For this purpose, the exterior surface 68 of the insert body is dimensioned to be slightly less than the diameter of the central bore 32. A central throughbore 70 extends from the first end 72 to the second or fastener receiving end 74. Disposed along the exterior surface 68 of the insert body is an elongated, axially extending channel which slidably receives the end of retaining screw 50. The retaining screw 50 and the elongated channel 76 function as a conventional slot and key arrangement to allow non-rotational axial movement of the insert body within the outer housing 26. The axial extent of movement is, of course, limited by the length of channel 76.

Extending axially inward from the fastener receiving end 74 of the body are a plurality of radial slots 78, 80, 82, and 84 disposed in circumferentially spaced relation about the body 66. The slots are shown as being spaced at 90° from one another, although it will be understood that a greater or lesser number of slots at other spaced relationships may be used with equal success. The slots extend radially inward from the exterior surface 68 and extend axially from the fastener receiving end 74 a distance approximately one-fourth to one-half of the total body length. Each slot includes a pair of radially disposed openings 86, 88 which extend to throughbore 70. A circumferentially extending groove 96 intersects the slots at an area between the radial openings 86, 88 for receipt of an elastomeric member 98 as will be described further hereinafter. The body also includes an expanded cylindrical recess 100 extending axially inward from the fastener receiving end. The intersection of the recess 100 and the throughbore 70 defines a shoulder 102. A chamfer 104 is formed on the exterior surface at the fastener receiving end of the body.

Plural grasping means or jaws 110, 112, 114, and 116 are provided at the fastener receiving end. The jaws are identical to one another so that the following detailed description of one is applicable to the others. As shown, one of the jaws is provided for each slot, it being thus understood that a number greater or less than four may also be utilized. Each jaw comprises an elongated, thin rigid member having a width designed for free receipt in the slots. A first or pivoting end 118 includes a pivot post 120 extending radially inward from the main structure 122 of the jaw. The pivot post is adapted for operative receipt in radial opening 86 in the slot, but does not extend completely through to the throughbore 70. A second post 124 is provided on each jaw and extends radially inward a greater distance than the pivot post. The second post is adapted for receipt in radial opening 88 of the slot 78. The outermost end 126 of the second post extends into the area defined by throughbore 70.

Provided at the second or grasping end 130 of the jaw is a toothed edge 128. A pair of canted surfaces 132, 134 comprise the outer end of each jaw forming a point at their intersection. A radially outer or exterior surface 140 extends from the canted surface 132 in an axial direction toward the first pivoting end 118. A notch 142 is provided at a position axially disposed between the pivot flange and second flange for receipt of an elastomeric member 98. The elastomeric ring member 98 resiliently encompasses the insert body, fitting within the circumferential groove 96 in the insert body, and engaging the notches of the jaws to thus bias the jaws radially inwardly and retain them in their respective slots.

With continued reference to FIGS. 2, 5, and 5A, a press rod 148 formed of steel or similar material is dimensioned for free receipt in central throughbore 70 of the insert body. A first end 150 of the press rod is received in cavity 34 of the outer housing. Axially spaced from the first end is a retaining ring groove 152 of reduced diameter. A second or cam groove 154 is disposed adjacent a second end 156 of the rod. Operatively received in the retaining ring groove 152 is a retaining ring 158 which cooperates with spring 160 to maintain the insert body biased axially outwardly relative to both the outer housing and the press rod. The groove 154 includes a canted cam surface 170 adapated to abuttingly engage the end 126 of the post 124 and thereby impart rotational movement to the jaws about their respective pivot posts 120.

When assembled, the insert body is biased to an outer or fastener gripping position as illustrated in FIG. 5. The ends 126 of the posts 124 extend through their respective radial openings 88 and rest within groove 154 of the press rod. The toothed edges 128 are then in their radially innermost position and extend into the recess 100 of the insert body. Thus, when the tool is in the gripping position the teeth on the jaws are positioned to cooperate with the outer end of the insert body to grasp and retain the head end E' of a fastener disposed inthe recess 100. The stem of the fastener, however, protrudes beyond the end of the tool, as shown.

To insert the fastener into an opening, the tool is oriented so that the stem of the fastener is aligned with the fastener receiving opening. The tool is then driven forward such that the stem of the fastener enters the opening. After receiving end 74 of the tool engages the stationary surface adjacent the fastener receiving opening, continued manual forward thrust on the outer housing causes the biasing force of the spring 160 to be overcome so that the outer housing 26 and press rod 148 move forward relative to the insert body. As the insert body retracts into the outer housing, the push rod engages the head end of the fastener and forces it out of the hand tool and into the fastener-receiving opening (not shown). Also, the relative axial movement between the outer housing and the insert body, as well as between the insert body and press rod, forces the ends 126 of the posts 124 to engage the canted surface 170 of the cam groove. The respective jaws are thus pushed to an outer radial position as they rotate about their pivot post 120, thereby releasing their grip on the fastener. The resulting non-gripping position is shown in FIG. 5A.

The elastomeric member 98 exerts a circumferential restraining force on the jaw urging them into their normal, radially inward position. Therefore, upon retraction of the fastening tool, the insert body is pushed out of the outer housing by spring 160, the posts 124 slip back into the cam groove 154, and the grasping jaws return to their inital gripping position due to the force exerted by elastomeric member 98.

In assembly line production, fasteners must be supplied in such a manner that they can be easily and efficiently installed by the operator. In accordance with one aspect of the present invention, a feeder mechanism is provided for semi-automatically loading individual fasteners into the insertion tool. As shown in FIG. 1, conventional vibratory bowl feeder A provides a continuous supply of fasteners E to track B as is well known in the art. Track B is angularly disposed forming an incline from the vibratory bowl feeder A to the escapement unit C so that the fasteners travel down the track under the influence of gravity. FIG. 4 illustrates the positioning of the fastener E in the track. An outer surface 180 has a central opening 182 which communicates with a recess 184 for receipt of the head E' of a fastener. The fastener shank E'' extends through a second or inner track surface 186.

Figure 6:
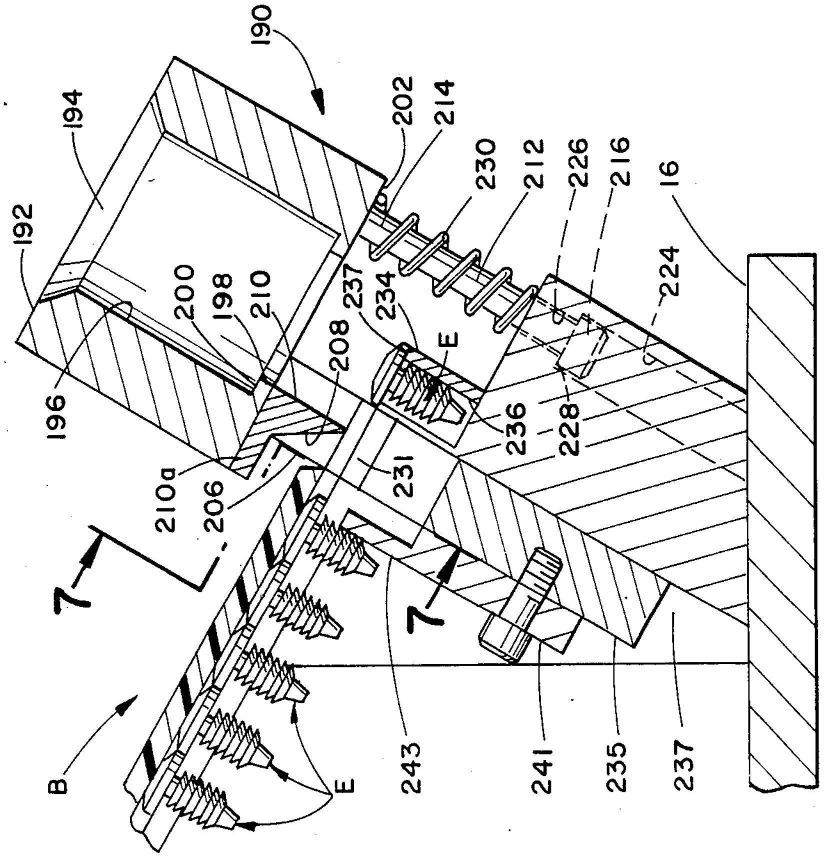
FIGS. 6 and 6A are cross-sectional views taken on line 6—6 of FIG. 3 showing, respectively, the escapement unit in position for receiving the fastener inserting tool, and the fastener inserting tool inserted into the unit in fastener grasping position; and, FIG. 7 is a view taken on line 7—7 of FIG. 6.

With particular reference to FIGS. 1, 3 and 6, the escapement unit C has an alignment plate 190 that includes an upper planar surface 192 having a central frusto-conical recess 194 formed therein. A cylindrical second recess 196 communicates with recess 194. Recess 196 opens into a third cylindrical bore 198 which is coaxial with recesses 194 and 196. Recesses 194 and 196 and bore 198 together complete a through hole extending from the upper surface 192 to the lower surface 202 of the alignment plate. The bore 198 and recess 196 define a shoulder 200 which faces the upper surface 202 of the alignment plate 190.

A block 210 is fixed to the bottom of the alignment plate 190 by a pair of machine screws 211 (see FIG. 3) which extend through plate 190 into threaded engagement with portion 210a of block 210. The face 206 of block 210 is parallel to surface 204, but is offset inwardly therefrom. An arcuate recess 208 extends inwardly of face 206 for purposes subsequently to be described.

Rods or support members 212, four in number in the preferred embodiment, support the alignment plate 190. One end 214 of each support member 212 is fixedly embedded in the alignment plate while the distal end, having a flanged head portion 216, is slidably received in bores 224 formed in a base 218. The bores 224 have a reduced counter bore 226 forming shoulder 228 that abuts the flanged head portion 216 of rods 212. Biasing means 230, such as coil springs or the like, are disposed concentrically about the support members 212, and extend between the alignment plate 190 and the base block. The springs 230 bias the alignment plate 190 to an outer or first position.

Figure 7:
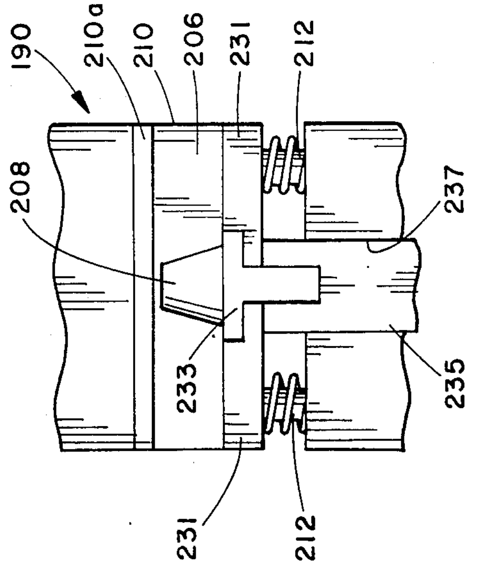

The alignment plate assembly also carries a movable track section 232 formed by a pair of members 231 connected to the block 210 as best shown in FIGURES 6 and 7. The members 231 cooperate to define a fastener guide opening 233 which aligns with the recess 184 of stationary track B for receipt of the individual fasteners when the alignment plate is in the upper position of FIG. 6.

Extending downwardly from the underside of members 231 is a guide bar 235 whichis slidably received in a groove 237 formed in base 218. Bar 235 is bifurcated at its upper end, as shown in FIG. 7, to form the lower open portion of guide opening 233. A stop or fastener blocking member 241 is carried by bar 235 and has an end portion 243 (see FIG. 6) which extends upwardly toward stationary track B.

The movable track section 232 bridges the gap between the stationary track B and a fixed loading station 234 extending upwardly from the base 218. Loading station 234 is, as best seen in FIG. 3, of general cylindrical configuration. Its outer diameter is less than the diameter of the head of the fastener E and, also, less than the diameter of recess 100 in insert body 66. As shown, loading station 234 extends upwardly from base 218 and has its top surface 237 in alignment with the bottom of track recess 184. A U-shaped slot 236 is aligned with the track recess and extends inwardly from the side of station 234. This allows a fastener E to be received in and supported centrally of station 234 in position for loading into the hand tool D.

With particular reference to FIGS. 3 and 6, the outer surface 192 of the alignment plate is shown in greater detail. The frusto-conical recess 194 cooperates with the chamfered surfaces 58, 104 on the outer housing and insert body of the fastener tool, respectively, to guide the hand tool into the inner recess 196. The inner recess 196 closely receives the hand tool and ensures that the tool is properly aligned with loading station 234. The shoulder 200 defined between the cylindrical recess 196 and bore 198 abuts the housing end 38 to prevent further insertion of the hand tool into the alignment plate.

Figure 6A:
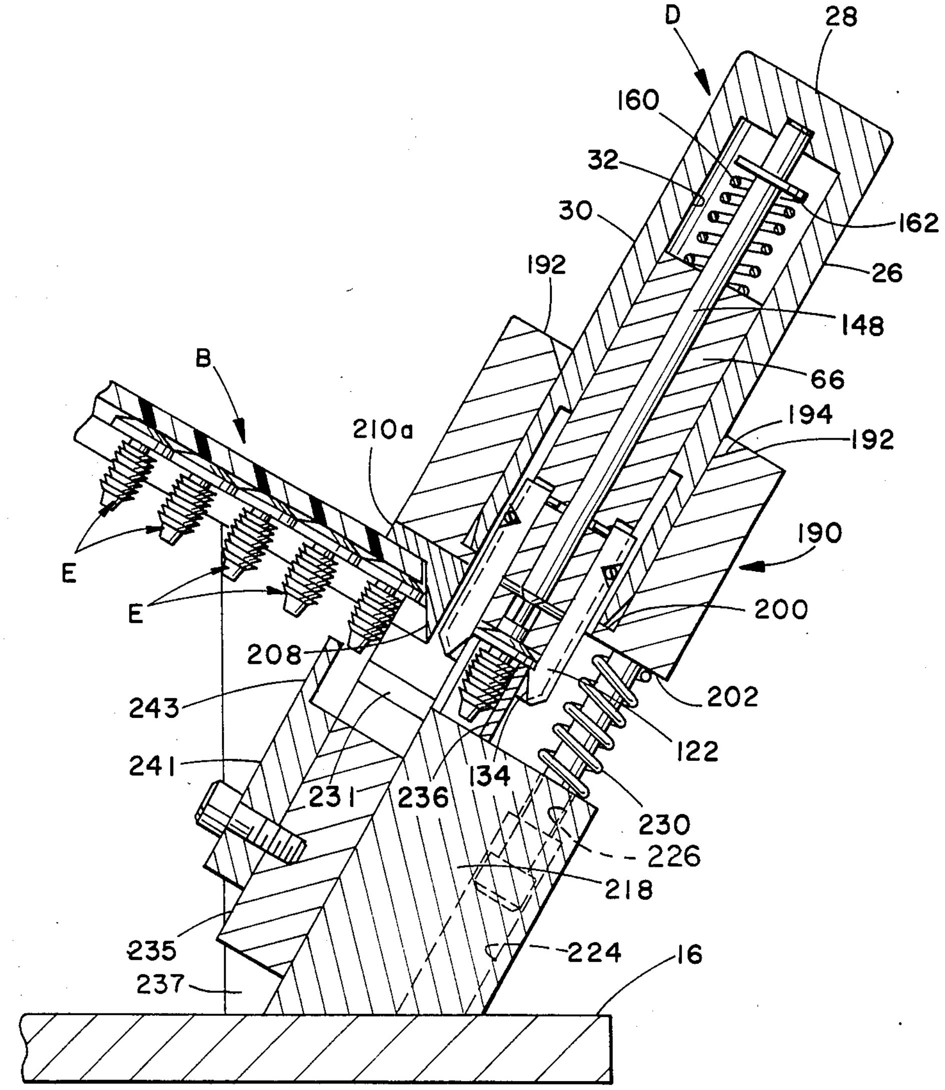

After the hand tool is inserted into the escapement unit C, it may be loaded with a fastener by simply depressing the tool. Manual thrust exerted downwardly on the housing 26 is transferred to shoulder 200 of the alignment plate and overcomes the predetermined biasing force of spring members 230. This causes the alignment plate to move downwardly toward the base block 218. The downward movement of the hand tool also causes the surfaces 134 of jaws 122 to engage the head of the fastener on loading section 234 and cam radially outwardly. When the toothed edges 128 of the jaws pass the radial edge of the fastener E they pivot inwardly under the bias of elastomeric member 98 and grip the fastener, as shown in FIG. 6A. Further downward movement is prevented by engagement of press rod 48 with the top of the fastener.

As the hand tool is pressed down to pick up the fastener at loading section 234, the alignment plate moves downwardly, so too, does the stop finger 243 to release the fastener in position at the end of the fixed track section. Simultaneously, member 210 moves down causing recess 208 of surface 206 to move in front of the next fastener on the end of the fixed track section to prevent it from moving beyond the point shown in FIG. 6A.

As the hand tool is removed from the escapement unit, the alignment plate moves upwardly relative to the base block 218. The stop finger 243 also moves upwardly entering between the last two fasteners on the fixed track B. Simultaneously, the movable track section 232 comes up into alignment with the fixed track section and the loading station 234. Thus, the fastener previously held in position on the end of the fixed track section by recess 208 is then free to gravity feed into the U-shaped slot of the loading station. The described cycle is repeated continuously as fasteners are removed from the fixed loading station.

Once a worker has loaded a fastener into the tool, the hand tool is removed from the escapement unit and is transported to an associated workpiece or panel (not shown). The shank member E'' of the fastener is aligned for axial insertion into a preformed opening or hole in the workpiece. The tool is then driven forward axially to force the fastener into the opening. As the fastener is inserted into the workpiece opening the jaws rotate into a non-engaging relationship due to the cam groove 154 and the fastener is forced axially outward from the fastener tool due to engagement of the fastener head with the press rod 148. The fastener tool is thereafter free for receipt of a new fastener as previously described.

The invention has been described with reference to the preferred embodiment. Obviously modifications and alterations will occur to others upon a reading and understanding of this specification. It is intended to include all such modifications and alterations insofar as they come within the scope of the appended claims or the equivalents thereof.

Having thus described the invention, it is now claimed:

1. A fastener insertion tool adapted for manual operation comprising:
   - a housing adapted to be grasped by a tool operator, said housing having a bore formed therein,
   - an insert body slidably received in said bore such that one end of said body is interior of said bore and the other end is exterior of said bore, said body being movable between extended and retracted positions relative to said bore,
   - means for maintaining said insert body under a continual bias toward said extended position;
   - grasping means carried on the exterior end of said body and having jaw portions located outwardly of the exterior end of said body for selectively grasping fasteners, said jaw portions having gripping and non-gripping positions,
   - operating means for moving said jaw portions from said gripping to said non-gripping position as said insert body moves from said extended to said retracted position,
   - a press rod disposed in said bore and extending through said body for transmitting manually applied fastener insertion force from said housing to a fastener grasped by said grasping means, regardless of retraction of said insert body; and,
   - said operating means including cooperating surfaces carried by said press rod and said grasping means for moving said jaw portions to said non-gripping position as said body moves to said retracted position.

2. The fastener insertion tool as defined in claim 1 wherein said press rod has an exterior end portion located generally centrally of said grasping means.

3. A fastener insertion tool as defined in claim 2 wherein said grasping means comprises plural members mounted on the exterior end of said body circumferentially of the exterior end portion of said press rod.

4. The fastener insertion tool as defined in claim 3 including means for maintaining said jaw portions biased toward said gripping position.

5. The fastener insertion tool as defined in claim 3 wherein said members each include a tooth portion which extends radially inwardly of the outer surface of said press rod when said grasping means are in said gripping position.

6. The fastener insertion tool as defined in claim 3 wherein said members are mounted for pivotal movement in slots formed in said insert body.

* * * * *